4 Sheets, Sheet 1.

Kent & Bancroft,
Spinning Mule.

No. 105,812. Patented July 26, 1870.

Witnesses,
L. Hailer
D. Hannay

Inventors,
P. J. Kent
H. W. Bancroft
by Dodge & Munn
their Attys

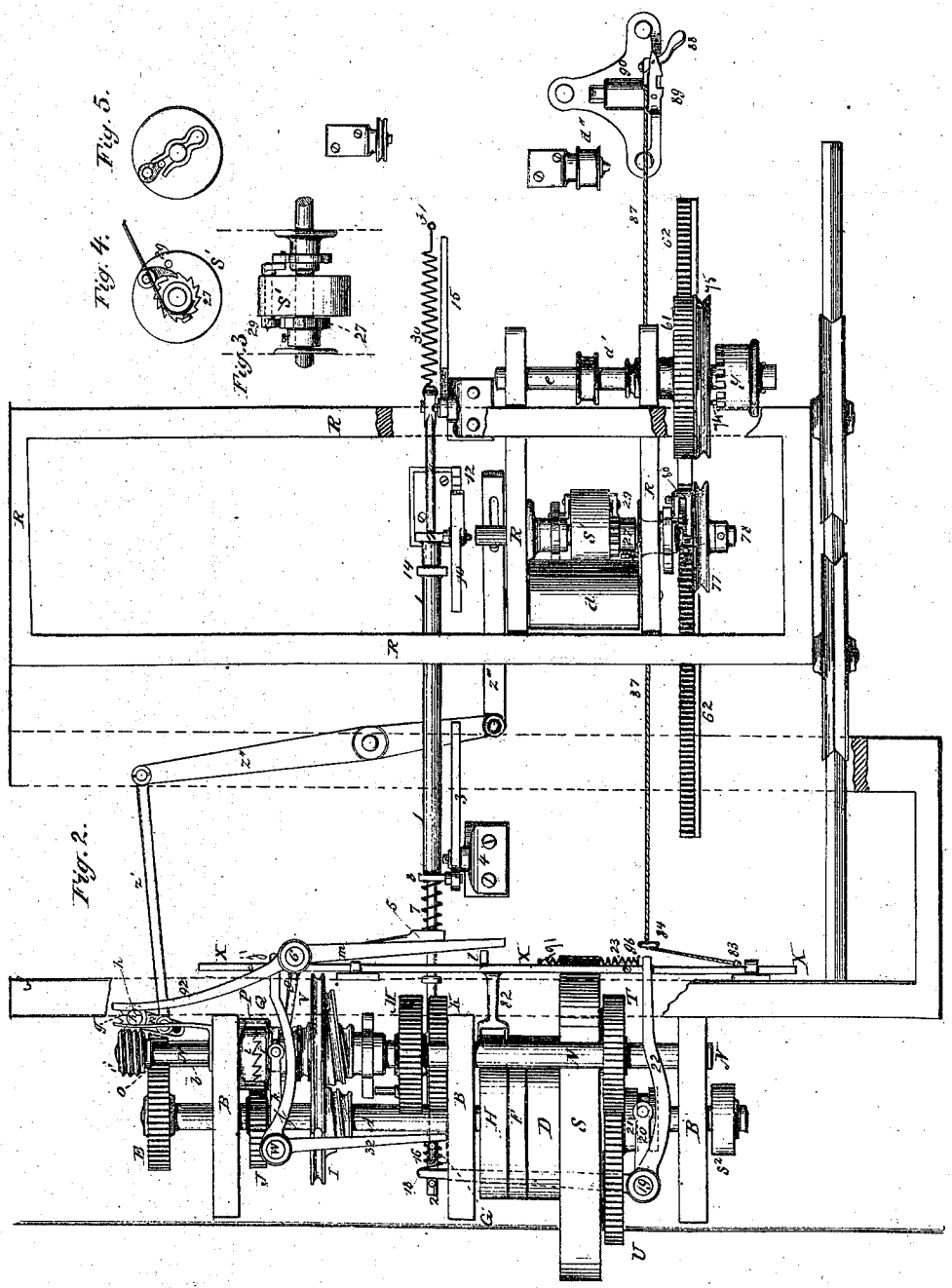

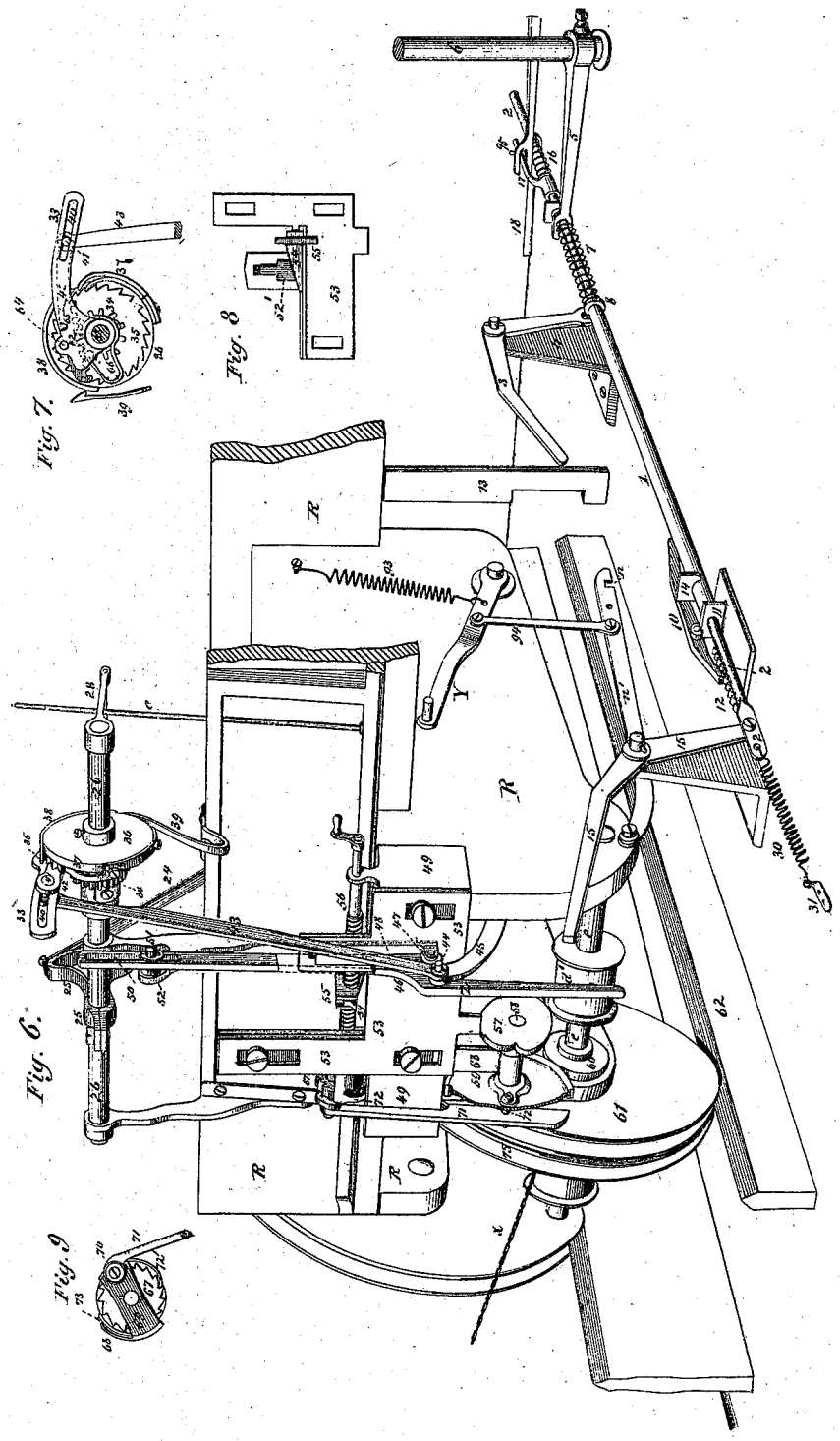

Kent & Bancroft,
Spinning Mule.
No. 105,812. Patented Jul. 26, 1870.
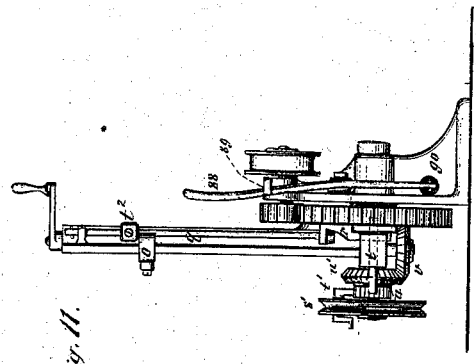
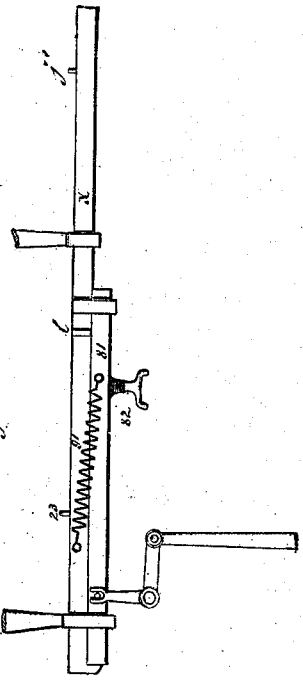
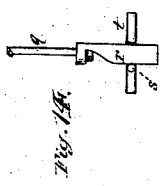
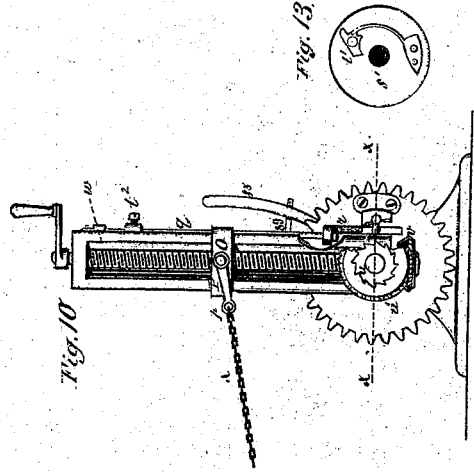
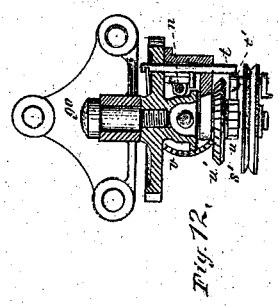

UNITED STATES PATENT OFFICE.

PRENTISS J. KENT AND NATHAN W. BANCROFT, OF WORCESTER, ASSIGNOR TO THEMSELVES, J. RICH KENT, AND JOHN G. AVERY, OF SPENCER, MASSACHUSETTS.

IMPROVEMENT IN SELF-ACTING MULES FOR SPINNING.

Specification forming part of Letters Patent No. 105,812, dated July 26, 1870.

*To all whom it may concern:*

Be it known that we, PRENTISS J. KENT and NATHAN W. BANCROFT, of Worcester, in the county of Worcester and State of Massachusetts, have invented certain new and useful Improvements in Self-Acting Jacks for Spinning Yarn, &c., of which the following is a full, clear, and exact description, reference being had to the accompanying drawings, making part of this specification, in which—

Figure 1:
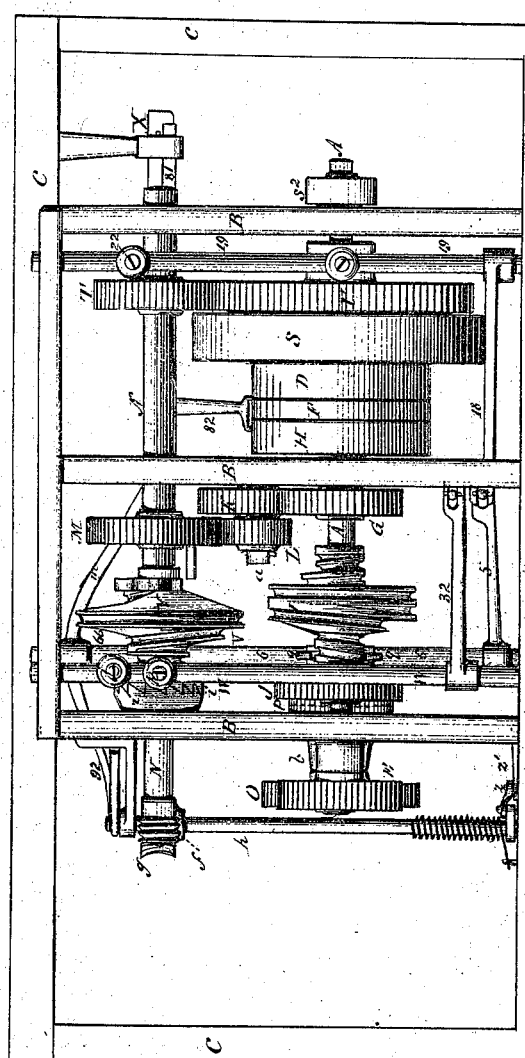
Figure 16:
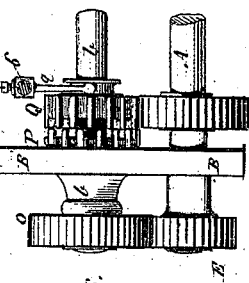

Figure 1 represents a rear elevation of a machine having our improvements applied thereto, to illustrate the arrangement of the driving-gears and drawing in and out scrolls, as also the gears for retracting the carriage while throwing in the twist. In this view the traveling carriage is removed. Fig. 2 represents a plan of the same, but with the carriage in place, the faller-frame of the latter, together with its actuating mechanism, being removed, as also the compensating gears and mechanism. Fig. 3 represents a detached view, in elevation, of the carrying-pulley of the carriage, together with the faller-belt pulley, ratchet-wheel, and dog; and Fig. 4, a side elevation of the same. Fig. 5 represents a similar view of the other side, showing the friction-yoke that operates the arm of the dog. Fig. 6 represents a view, in perspective, of the carriage and rails upon which it travels, as also the main shipping-rod, together with its attachments, all being shown in proper connection. Fig. 7 represents a side elevation of the apparatus that regulates the rise and fall of the faller-frame, the same being detached from the carriage, and its shaft shown in section. Fig. 8 represents a detached view, in elevation, of the inside of the builder-plate that regulates the winding of the yarn in conical layers on the bobbins or cops. Fig. 9 represents a detached view, in elevation, of the mechanism that operates the builder-screw, and by means of which the apparatus is adapted to the winding either of fine or coarse yarn. Fig. 10 represents a side view of the compensating movement, the pulley that operates the screw being removed. Fig. 11 represents a front view of the same, and Fig. 12 a horizontal section through the line $x$ $x$ of Fig. 10, the driving-pulley, ratchet-wheel, dog, and vertical bevel-pinion being shown in plan. Fig. 13 represents a detached view of the inner side of the driving-pulley to illustrate the arrangement of the dog, and Fig. 14 a similar view of the inclined plate and slide that detaches the dog and stops the further ascent of the screw-head that carries one end of the compensating-chain. Fig. 15 represents a detached view, in elevation, of the main and auxiliary shipping-bars, and modification of the method of operating the latter. Fig. 16 represents a detached view of the clutch-gear for throwing the lower scroll in and out of gear.

Our invention relates to a new and improved self-acting jack for spinning purposes, but more especially to the spinning of woolen threads or yarns. An automatic machine for this purpose must be capable of performing certain duties, among the principal of which may be enumerated the following, to wit:

First. So to combine the traveling spindle carriage or jack with the drawing or delivery rolls as that the delivery of the roving from the latter to the spindles shall have a certain relation to the twisting of the roving and the outward motion of the carriage, the motion of the latter for this purpose being so contrived that as it nears the end of its outward journey or stretch it shall have a gradually-decreasing rate of speed without any diminution of the speed of the spindles, the delivery of the roving from the drawing-rolls being at this time entirely stopped. By this arrangement any unevenness in the thickness of the yarn is removed by the draw of the carriage, while the necessary twist is given to it. As the finishing of the twist will necessarily shorten the stretch, devices must also be arranged whereby the carriage, after it has reached the end of its outward journey, may be retracted for a short distance, to admit of the shortening without straining or impairing the strength of the yarn.

Second. A stretch of yarn having been twisted, in length nearly equal to the traverse of the jack outward, it then becomes necessary for the apparatus to wind it in an even and regular manner upon the bobbins or cops before a new stretch can be spun. This operation involves a number of delicate manipulations and the use of a great variety of intricate and complicated devices, the objects of which we will endeavor briefly to explain.

The yarn having been twisted as just mentioned, the machinery must then be so acted upon as to perform what, in spinning technology, is termed the "backing off" operation preparatory to its being wound in the proper manner upon the cops. This operation consists simply in unwinding from the spindles such yarn as during the spinning had been wound slantingly on their points. Simultaneously with the finishing of this movement must the fallers which guide the yarn as it is wound on the cops have been thrown into position for that purpose, and into gear with their necessary actuating machinery; and so with the machinery that operates the winding-apparatus, as also that for retracting the jack. In addition to these, devices must also be provided by which the yarn may be wound upon the cops in regular layers, arranged in lines parallel with the face of a cone, and that with a motion so regulated that the motion of the carriage backward and the winding of the yarn on the cops must be equal, in order that a constant and even tension on the yarn may be had during the whole operation. Now, were the spindles to have the same invariable speed throughout this operation, and the relative speed of the carriage also to remain constant, it would speedily result in breaking the yarns, for this reason, that one revolution of the bobbin when empty would wind up but little, whereas a single revolution when winding the outer strand of a layer (its diameter being so much greater) would require a much greater length of the yarn to complete the circuit. Hence, compensating devices must be provided to so regulate the relative speed of the two that the motion of the carriage backward and the winding up of the twisted yarn may be synchronous and equal.

The operation of winding having been effected, (and the machinery must also be adapted as well to spinning as to winding fine yarn,) it then becomes necessary for the machinery to be momentarily stopped, in order that the operation called "piecing" may be performed. This accomplished, the machinery is again started on a new stretch, the winding-up machinery meanwhile having been automatically thrown out of gear for that purpose.

To provide a self-acting jack, which shall be capable of carrying into practical effect all of the conditions above specified, and which can be readily and cheaply attached to hand-jack machines, so as to take their place, is the object of our invention.

Our invention for these purposes consists in a new and peculiar arrangement of driving pulleys and gears, in combination with the drawing-scrolls that move the carriage or jack in and out during the operations of spinning and winding.

It also consists in the combination of a portion of these gears and driving-pulley with a friction-gear, whereby the race-belt that drives the spindles is temporarily reversed, as required, in order to perform the operation technically called "backing off."

It further consists in a new arrangement and combination of devices for the retraction of the carriage or jack a short distance during the throwing in of the finishing twist to the yarn; also, in a new and peculiar arrangement and combination of devices for throwing the machinery that draws the carriage out out of gear when it has reached the end of its stretch; also, in a new arrangement and combination of devices for throwing the machinery into gear that is to draw the carriage back during the operation of winding the yarn; as also the devices for throwing it out of gear when that operation is performed, and for throwing the machinery into gear that is to draw the carriage out during the operation of spinning.

It further consists in a new and peculiar arrangement of devices for holding the clutch into gear during the drawing-out operation of the carriage, as also to prevent both scrolls from being in gear at the same time; also, in a new combination of devices to be used in connection with the race-belt, whereby on the reversal of the motion of the latter the operation of backing off is effected in a simpler manner than heretofore, and by means of which the self-acting attachment may be applied to the ordinary hand-jack without the removal of the drum that drives the spindles; also, in a new arrangement of devices in connection with the drum that drives the spindles, whereby during the spinning part of the operation the train of gears that drives the drum during the winding up of the yarn on the cops is allowed to remain at rest, comparatively speaking, instead of revolving with the speed of the carrying-pulley that drives the drum through the medium of the race-belt, as in other machines; also, in a new and improved arrangement of devices for communicating motion from the chain-spool to the drum that drives the spindles; also, in the peculiar arrangement and combination of devices whereby the reversal of the race-belt is effected automatically; as also in several combinations of devices whereby the winding of the spun yarn is automatically effected in a regular and even manner upon the bobbins, and with a speed corresponding to the speed of the backward motion of the carriage; and, lastly, in the combination of an auxiliary belt-shipper with the main belt-shipper and devices for operating them, whereby the motion of the machine may be stopped at any moment and again renewed without throwing any of the other parts out of gear.

To enable others skilled in the art to make, construct, and use our improvements, we will now proceed to describe them in detail, omitting a particular description of such parts of a common spinning-jack as may be unnecessary to a full understanding of the invention, reference here being specially called to the form and peculiar arrangement of the several parts, as illustrated in the drawings, which form part of this specification.

The main or driving shaft A is mounted in suitable bearings arranged in the side beams or standards B of the frame or head-stock, which is attached in a secure manner to the main frame C of the jack. Upon this shaft and firmly keyed thereto are mounted the main driving-pulley D and the small gear-wheel E, while mounted loosely thereon is the driving-pulley F, the latter carrying on the end of its hollow sleeve or boss the gear-wheel G, intermediate between which is arranged the loose pulley H. In the same manner—that is to say, loosely upon the main shaft—are mounted the drawing-out scroll I and gear-wheel J, the latter being firmly secured to the hollow sleeve of the former.

Upon reference to the drawing, Fig. 1, it will be perceived that the gear-wheel G, that is mounted on the sleeve of the driving-pulley F, is made to mesh with a carrier-wheel, K, mounted loosely on a stud, $a$, on the face of which is formed another and smaller pinion, L, whose teeth are intended to engage with those of another gear-wheel, M, mounted on and by means of which motion is communicated from the main shaft A to the upper driving-shaft, N.

Again, the gear-wheel E is made to mesh into another and larger gear-wheel, O, that is mounted upon the outer end of the shaft $b$, having its bearings in the side standard B, whose other end, on the inside of this standard B, carries another pinion, P, keyed fast to the shaft $b$, together with a sliding clutch-gear pinion, Q, whose teeth mesh with the teeth of the loose gear-pinion J, that drives the lower or drawing-out scroll, I.

With a series of gears thus arranged, it will be seen that when the clutch-gear Q is thrown into gear with the inner pinion, P, of the shaft $b$, and motion imparted to the driving-shaft, A, by means of the pulley D, the following effect will be produced: The shaft A, being keyed to the driving-gear E, imparts through it motion to the gear O, and by the latter, through the shaft $b$, to the pinion P, which now, meshing with the clutch-gear Q, gives motion to the gear-wheel J, that actuates the drawing-out scroll I, and which, through a cord suitably rigged and attached to the carriage or jack, draws the latter outward and forward during the spinning or twisting of the yarn until it has reached the outer end of its intended stretch, at which point the clutch-gear Q is disengaged from the gear P, for the purpose of stopping the further advance of the carriage.

Now, the object of this peculiar arrangement and combination of gears with the lower scroll, I, is not simply to impart an intermittent outward motion to the carriage in connection with the devices for imparting an inward motion to the same, but so to regulate its speed that during its progress outward sufficient time may be given for the spindles $c$ to impart the necessary degree of twist for the formation of good yarn or thread. Hence, among other reasons, one intention of the gears, as combined, is to lower the normal speed given by the driving-shaft A down to a considerably slower speed for the lower scroll, I, as, were it otherwise, but little if any twist could be imparted to the yarn during the advance of the carriage. Again, the diameter of the scroll I is some five or six times greater than that of the rolls that deliver the roving to the spindles, so that were both to revolve with the same speed, the result would be that the motion of the crrriage outward would exceed by that number of times the delivery of the roving—a condition of things incompatible with the spinning of a yarn from a roving such as is used in spinning-jacks. Another intention, therefore, of the gearing is so to regulate the progress of the carriage with regard to the delivery of the roving from the draw-rolls that the two shall be nearly or quite equal the one to the other. But, as this equality of speed somewhat depends upon the quality of the wool (length of the staple, &c.) forming the roving, the jack is provided with a series of sets of gear, by means of which the relative speed of the scroll I, with regard to the drawing-rolls, may be regulated at pleasure by the substitution of one set for another, so as slightly to increase or diminish the draw on the roving as delivered by the rolls, as the circumstances of the case may demand. For this purpose the two gears E and O are made removable from their respective shafts, that they may be replaced by others which will give the required speed.

By this arrangement of the gears, just described, another great advantage is obtained, as it enables us to mount the drawing-out scroll I directly upon the main shaft A, whereby the use of an extra shaft for that purpose, with its train of actuating-gears, is dispensed with and unnecessary complication of the machine avoided.

While the carriage R is being drawn outward by the devices above described, a pulley, S, formed on or otherwise secured to the driving-pulley D, through the medium of a band, (passing over a carrying-pulley, S', mounted in the carriage-frame R, and thence around the driving-drum $d$ of the spindles, and from that over the loose guide-pulley $d'$ on the stationary shaft $e$, arranged on and secured to the under side and forward end of the carriage R, and thence around another carrying-pulley, $d''$, mounted on a standard secured to the floor, back to the pulley S on the main shaft,) imparts the necessary motion to the spindles which give the twist to the yarn, this belt forming the usual traveling or race belt of jacks, by means of which, while the carriage carrying the spindles is made to travel back and forth, the spindles are made to revolve throughout the whole outward movement of the carriage with a uniformly-rapid motion, the same speed of the spindles being still continued after the carriage has stopped, until the necessary amount of twist to the yarn has been thrown in, and by means of which, also, as the carriage is being drawn back, a regulated but unequally slow motion is given to the spindles for the purpose of winding the twisted yarn on the cops or bobbins. The motion from the drum to the spindles is given by means of belts passing around the drum and a small pulley arranged on the lower end of the spindles.

While these operations have been going on, the main driving-belt of the machine has been acting also on the driving-pulley F, whereby motion has been communicated to the upper driving-shaft, N, through the medium of the gear G, carrier-gear K, and transmitting-gear L, the latter for this purpose being so arranged that its teeth shall mesh into the teeth of the gear-pinion M, the latter being keyed fast to the shaft N. Upon this shaft is also keyed another pinion, T, whose teeth engage with the teeth of a large friction-wheel, U, for a purpose shortly to be explained. The other end of the shaft N carries an endless screw, $f$, the worm or thread of which is intended to engage with the teeth of a concave segmental pinion, $g$, mounted on the upper end of a swinging rock-shaft, $h$, the lower end of which is stepped in a bearing secured to the floor, for a purpose which will shortly hereinafter be described.

Besides these, upon the same shaft N there is also arranged and secured a clutch-gear, $i$, whose teeth are intended to engage with a corresponding clutch-gear pinion, $i'$, secured on the end of the sliding sleeve of the upper or drawing-in scroll, V, both, by means of the sliding sleeve being loosely mounted on the shaft N, so as to be free to slide back and forth, and in this way to be engaged with or disengaged from the clutch-gear $i$, for which purpose a bifurcated yoke or collar, having a rocking motion, is made to embrace the sleeve between the pinion $i'$ and the scroll, so as to throw them in and out of gear at proper intervals, when required, by the action of the rock-shaft W.

The rock-shaft W for this purpose is operated by means of an arm, $j$, extending over the shaft N and gear $i'$ toward the carriage, whence, curving downward, it projects sufficiently forward to bring its end within range of a pin, $j'$, arranged on and secured to the upper edge of the main shipper X, whereby, as the shipper X is moved so as to throw the belt on the main driving-pulley D and draw the carriage outward, the pin $j'$ on the shipper draws the arm $j$ along with it, and by that motion throws, through the medium of the forked yoke $k$, the drawing-in scroll V out of gear with the saw-clutch pinion $i$, thereby preparing the machine to commence twisting the yarn.

Previous to the description of that operation, however, it now becomes necessary to describe the devices used for throwing the drawing-out scroll I into gear. This operation is effected by means of a hollow sleeve-rod, 1, which is mounted over the main shipping-rod 2, to which is connected the lower end of an inclined bell-crank or double lever, 3, having its fulcrum on a standard, 4, secured to the floor. The end of this sleeve-rod 1, which is suitably formed for the purpose, is embraced by the forked end of a lever, 5, secured to the lower end of a rock-shaft, 6, whose bearings are respectively arranged in the upper beam of the frame of the machine and the floor, so that, as the sleeve-rod 1 is moved back or forth by the angle-lever 3, it will, by the action of the spiral spring 7 and the stud 8, formed near its end, communicate to the rock-shaft 6 a rocking motion through the medium of the arm or lever 5. To this rock-shaft 6, above and at right angles to the arm or lever 5, or thereabout, is arranged or secured a forked yoke, 9, the forks of which are made to embrace the boss of the clutch-gear Q and to project into a depression formed therein for the purpose, whereby as the rock-shaft 6 is turned the yoke, swinging with it, will, according to the direction of the movement, either throw the clutch-gear Q in or out of gear with the pinion P, as the case may be.

The spiral spring 7, just referred to, is so arranged as that while it surrounds the sliding sleeve-rod 1 its one end shall press or rest against the forked end of the lever 5, while its other end shall abut against a plate or stud, 8, secured to the sleeve-rod, and to which the lower end of the double or bell-crank lever 3 is connected, so that when the inclined end of the lever 3 is depressed the clutch-gear Q will be thrown into gear with the pinion P, in which position it is retained by means of a pawl, 10, pivoted to a plate, 11, secured to the other end of the sleeve-rod, engaging with a ratchet-bar, 12, suitably arranged on and secured to the floor for that purpose.

Here it now becomes necessary to remark that while the sleeve-rod 1 is thus thrown back sufficiently far through the action of the spiral spring 7 to throw the clutch-gear Q into gear, as described, there to be held by the pawl 10 and rack-bar 12 until released, yet the actual engagement of the clutch-gear Q with the clutch-teeth of the pinion P is temporarily suspended until a stud-pin, $l$, on the main shipping-bar X has been slid past the end of a lever, $m$, also secured to the rock-shaft above the forked yoke. This done, the rock-shaft 6 is then permitted to perform part of a revolution by the expansive force of the (at this time) compressed spring 7 on the arm 5 of the rock-shaft 6, the spring 7 for this purpose having been set by the pressure of the carriage on the angled lever 3 on its last retrograde movement, it (the carriage) at the same time or shortly thereafter, during the continuance of its backward motion, also sliding the main shipping-bar X along until the stud $l$, secured on its face, has slipped past the end of the lever $m$, thereby releasing the rock-shaft 6, and allowing it to throw the clutch Q into gear with the pinion, as before referred to. This movement, among other things, detaches or throws the upper or drawing in scroll, V, out of gear with the clutch-pinion $i$, and throws the driving-belt from the loose pulley H upon the driving-pulleys for a new advance of the carriage to spin a new stretch, the belt, as will shortly hereinafter be described, having been previously thrown off from these on the loose pulley during the inward motion of the jack or carriage for the proper winding up of the already spun or twisted yarn.

The slipping of the stud on the shipping-bar X past the end of the lever $m$ of the rock-shaft 6 is effected by means of a cam acting on a lever attached through proper connections to the main shipping-bar; but as this operation forms no part of our present improvements, and is not essential to a perfect understanding of them, it is deemed unnecessary to describe it more particularly than we have already done.

So far little if any mention has been made of the cord that connects the two scrolls I and V to the carriage R, and by which the latter is drawn alternately back and forth; but as this is effected in the usual manner it is not, for the reason already given, deemed necessary further to describe it.

In this condition the jack or carriage is ready for its forward movement, motion for this purpose being now communicated to the driving-pulleys F and D, the belt that leads from the pulley $S^2$ on the main driving-shaft communicating motion to the drawing or delivery rolls, and which motion is also, by gearing, transmitted to the drum which carries the roving-spools, so that both move with the same speed. As the delivery-rolls deliver the roving, the race-belt, passing around the drum $d$ of the carriage or jack R through an appropriate system of belting, communicates the twirling motion to the spindles, whereby the necessary twist is imparted to the roving to form yarn. Meanwhile the carriage, through the action of the lower scroll, I, is made to advance outward with a speed equal (where the fibers of wool being spun are long and of good quality) to the delivery of the draw or delivery rolls, whereby the yarn being spun is kept stretched with a constant and even tension—a condition necessary to a properly-spun thread. This state of things continues until the carriage nears the end of its outward stretch, when a pendent cam, 13, fastened to the rear of the carriage and projecting below it, by its lower end, acts upon the inclined end of the pawl 10, pivoted to the end plate 11 of the hollow sleeve-rod 1 of the lower or drawing-out scroll, I, disengaging it from the stationary rack-bar 12, holding it still in this position until, by the further advance of the carriage, the lower end of the pendent arm 13 shall force or drag the sleeve-rod 1 back by means of the stud-plate 14, thereby disengaging the clutch-gear Q from the gear P, thus stopping the further outward advance of the carriage. While the outward motion of the carriage has thus been stopped, the motion of the spindles is still continued, as before, until the yarn has received the necessary amount of twist intended to be given; but as the throwing in of this twist necessarily shortens the thread, were the carriage to be left stationary during this operation, the threads would either be broken or their strength much impaired by the strain. To obviate this the carriage is drawn gradually backward for a short distance by the throwing of the segmental pinion $g$ on the swinging rock-shaft $h$ into gear with the endless screw $f$ on the end of the upper shaft, N, by the arm 92 on the shaft 6, by means of which the rock-shaft is made slowly to perform a partial revolution, so that, being connected to a system of levers, Z, Z', Z'', and Z''', arranged on the floor, the last of which, by an upturned edge, is made to take into a notch, $n$, cut in an arm, $n'$, pivoted to the side of the frame of the jack, it drags the latter slowly back as the rock-shaft $h$ is turned, as before described.

Meanwhile as these operations have been going on, and before they have been completed, the carriage, as it was advancing to disengage the pawl 10, has by means of one end of a double lever, Y, having its fulcrum in the lower part of the carriage-frame, commenced depressing the upper end of the crank-lever 15, the lower end of which is connected to the end of the main shipping-rod 2, thereby gradually forcing the main shipping-rod 2 outward toward the main driving-shaft, by that motion compressing the spiral spring 16 between the end of one of its arms, 17, and the forked end of a lever, 18, that is made to embrace the rod 2. This lever is secured at its other end to an upright rock-shaft, 19. To this rock-shaft 19 is secured a forked yoke, 20, the ends of which are made to embrace the boss 21 of a friction-gear wheel, U, mounted loosely on the main shaft A. Immediately above this forked yoke 20, on the same rock-shaft 19, is arranged an arm or lever, 22, at right angles, or thereabout, to the lower arm, 18.

Now, as the bell-crank or angle lever 15 was depressed, as described, it caused the main shipping-rod 2 to compress the spiral spring 16 against the lever 18, which, were it not for a pin, 23, arranged on the upper side of the main shipper X, against which the arm 22 of the rock-shaft 19 is pressed, would otherwise force the friction-gear wheel U into gear with the pulley S, and thereby reverse the action of the race-belt; but as this action at that time would be inopportune, the necessary twist not having yet been communicated to the yarn, the main shipper with its pin is held in that position until the regulated amount of twist has been given, when, by the action of the twist-gear, (the necessary twist now having been given,) the main shipper is released, thus allowing the compressed spring 16, through the lever 18, rock-shaft 19, and forked yoke 20, to force the friction gear-wheel U into gear with the pulley S, in order to reverse the action of the race-belt, and thus perform that part of the operation technically called "backing off," or, in more familiar terms, to unwind the slanting yarn from the points of the spindles preparatory to a more perfect winding of the same upon the bobbins or "cops." This reversal of the race-belt through a short belt, 24, attached at one end to a segmental pulley, 25, on the faller-rod 26, and at the other end to a pin on a ratchet-wheel, 27, mounted on the shaft of the carrying-pulley S¹, has also drawn down the faller-frame 28 preparatory to the winding of the yarn on the cops. This ratchet-wheel 27 is so arranged with regard to the carrying-pulley S¹ that, while the race-belt has its normal direction of motion such as it has when the carriage or jack is moved out, it will remain at rest; but when the motion of the race-belt is reversed, then it will, by means of a self-acting dog, 29, throw it into gear with the pulley S¹, and impart motion to the same, whereby the belt 24 is wound up, and the faller 28 drawn down into position for winding the yarn, as before mentioned.

Now, by this drawing down of the faller-frame 28 the crank or inclined angle lever 15 of the main shipping-rod 2 has been released from the pressure of the outer arm of the double lever Y, thereby allowing the main shipping-rod 2 to be drawn back to its original position by the traction of the spring 30, for which purpose one end of said spring is attached to the end of the rod, and the other to a stud or pin, 31, suitably arranged on the floor. This retraction of the shipping-rod 2 throws the friction-gear U out of gear with the pulley S, thereby momentarily stopping the latter, and at the same time, through the lever 32, rock-shaft W, and fork k, throws the clutch i' of the drawing-in or upper scroll in gear with the saw-clutch gear i, so as to draw the carriage or jack back toward the delivery-roll beam.

Simultaneously with the release of the angle-lever 15 from the pressure of the double lever Y has been the release of the notched arm w' from the upturned edge of the lever z''', thereby freeing the carriage for its next backward movement during the winding up of the yarn. This release is effected by means of a link or connecting-rod, 94, attached at one end to a pin arranged on the side of the double lever Y, and at the other to a pin on the notched arm w', so that as the former is raised to release the angle-lever 15 it, by means of the link 94, raises and thereby detaches the arm w' from the upturned edge of the lever z''', being assisted in this respect by the traction of the spiral spring 93. While these operations have been going on the draw-rolls have remained stationary.

The disengagement of the angle-lever 15 from the pressure of the double lever Y by the drawing down of the faller-frame 28 is effected in this way: Besides the segmental pulley 25, already mentioned as being mounted on the faller-shaft 26, there is arranged another but slotted segment, 33, also made fast to the shaft, and beyond which are mounted a small pinion, 34, and ratchet-wheel 35—in such manner, however, as to turn freely on the shaft. At the side of the ratchet-wheel is securely bolted on the shaft 26 a disk, 36, carrying a spring double dog, 37, so arranged as to engage with the teeth of the ratchet-wheel 35, while below the teeth of the double dog a guard-plate, 38, is arranged and secured to or otherwise formed on the disk-plate 36, for a purpose to be hereinafter described. Immediately below this guard-plate 36, and secured to the frame of the carriage, is arranged another detent or dog, 39, whose tooth is also intended to engage with the teeth of the ratchet-wheel, in the manner and for a purpose hereinafter to be described.

Referring back to the slot 40, arranged in the rear end of the segment 33, in it there will be found a pin, 41, on the outer end of which is pivoted the end of a rack-bar, 42, whose teeth engage with the teeth of the small pinion 34, while on the other end of the pin 41 is hinged or pivoted the upper end of a connecting-rod, 43, the lower end of which is pivoted at 44 to the side of the latch Z. On this lower pivot, 44, of the connecting-rod 43 is hinged the end of another connecting-rod, 45, running in a horizontal direction, whose other end is connected in a similar manner to a pin secured to the inner arm of the double lever Y, whose other arm depresses the angle-lever 15 of the main shipping-rod 2, so that, as the faller was depressed, as before described, by the strap 24, the segment 33, through the connecting-rods 43 and 45 and arm Y, unshipped the latch Z and raised the arm Y from off the angle-lever 15, thereby releasing the main shipping-rod, as before mentioned.

Simultaneously with the release of the main shipping-rod 2 by the drawing down of the faller 28 is the setting of the latch Z, which, by the raising of the outer end of the segment 33, has drawn up the connecting-rod 43, and with it the latch Z, until its seat 46 has cleared the friction-roll 47, that is arranged on the sliding plate 48 of the builder-frame 49, when, by its own gravity, the latch swings in and rests with its seat upon the friction-roll 47, as shown in Fig. 6. The upper end of the latch Z is provided with a guide-slot, 50, that is made to embrace a stud-pin, 51, secured to a lug, 52, formed on the supporting-standard of the faller-shaft. This slot and pin form the guide of the latch, as it is made to play up and down.

Now, upon the extent of this up and down motion (and it is that which builds the yarn on the bobbins or cops) depends the shape of the finished cop, and it is governed by the movements of the following devices, as communicated to the latch, and through the latter by the connecting-rod 43 and segment 33 to the faller.

As before stated, the seat 46 of the latch Z is, when the faller is drawn down, upon the friction-roll 47. Now this friction-roll has its bearings on the lower end of a slide-plate, 48, connected by means of a guide-plate, 52', working in a slot, to the builder-plate 53, in such manner as to be free to be moved up and down independently of the builder-plate, and which is effected in the following manner, and for a purpose to be hereinafter described.

The under side of the guide-plate 52', on the inside of the builder-plate 53, is made to rest upon a movable or adjustable plate, 54, arranged to run on a race provided for it on the inner side of the builder-plate, and is connected by means of a tongue on its inner face to a nut, 55, mounted on the builder-screw 56, the tongue of the plate engaging with a vertical groove cut in the side of the nut 55, so that while the plate 54 is made to traverse with the nut from side to side of the builder, as the builder-screw is turned, it is still free to slide up and down independently of the nut. Now the upper side of the adjustable or movable plate 54 is made inclined for some two-thirds of its length and horizontal for the remainder, while the under side of the guide-plate 52 is also inclined, but in the opposite direction. From this it will be seen that as the screw 56 is turned so as to force the inclined end of the plate 54 under the guide-plate 52, the friction-roll plate 48 will be raised, and vice versa, irrespective of the rising and falling motion which it will receive by the rising and falling of the builder-plate 53 proper, which latter movement is effected by the action of the heart-shaped cam 57 on the end of the shaft 58 of the gear-pulley 59, the latter for this purpose meshing with the teeth of a pinion, 60, secured to the side of the gear 61, whose teeth mesh into the teeth of a rack-bar, 62, arranged for that purpose on a suitably-prepared bed on the floor, in a line parallel with the line of motion of the carriage, which, as the latter is drawn back by the upper scroll, communicates motion to the gear 59 and cam 57, as before described. The shaft 58 of the cam 57 is suspended by a pendant, 63, from the under side of the builder-frame 49.

Now, the object of sliding the inclined plate 54 under the inclined guide-plate 52 of the friction-roll plate 48 will be apparent when it is perceived that the higher the latter is raised the lower can the faller 28 be depressed, and that this low depression of the faller is essential to the filling of the bottom of the bobbin with the spun yarn. From this it follows that the bottom of the bobbin will be filled when the high or horizontal part of the inclined plate 54 is immediately below the guide-plate 52 of the friction-roll plate 48.

Again, as the length of the first layers of the cone of yarn around the bobbin must necessarily be short, so must the traverse of the faller be correspondingly short. Under such circumstances it therefore becomes necessary to provide suitable means for this purpose. To this end the rack 42, which meshes into the pinion 34 on the faller-shaft 26, is forced back with its pivotal pin to the farther end of the slot 40 in the segment 33, so that its forward teeth may mesh with those of the pinion 34, in which position it is held in gear by the end of the small thumb-screw 64. The effect of this arrangement is apparent, as the farther the fulcrum of the actuating-lever 43 of the faller is removed from its center of motion, the shorter, for a given throw of the lever, will be the vibration of the faller, and vice versa.

Again, as each layer will increase the length of the cone, it becomes necessary to increase the length of the vibration of the faller; and this increase in the length will continue until the whole bottom of the bobbin has been filled, after which it remains uniform until the bobbin itself has been filled; for which purposes, therefore, each time the faller has been depressed and raised the ratchet-wheel 35, carrying the pinion 34, has been made to perform a partial revolution by the action of the double dog 37, which movement, carrying with it the pinion 34, draws the rack-bar 42 forward a corresponding distance, and with the latter the actuating-lever 43, both being pivoted to the same pin 41 that works in the slot 40 of the segment 33, by that motion bringing the end of the actuating-lever 43 nearer to the center of motion of the faller, consequently increasing to that extent the distance of the rise and fall of the faller, and thereby adapting it to wind a longer layer around the bobbin. This process of gradually increasing the length of the layers continues until the entire surface of the bottom of the bobbin has been filled with yarn wound in a conical form. As soon as this point has been reached the forward movement of the rack-bar 42 is stopped until the remainder of the bobbin has been filled, the length of the layers from that point upward being uniform. This is effected by means of a depression or notch, 65, on the upper side of the rack-bar 42, having been brought immediately under the end of the confining-screw 64, when a spring, 66, suitably arranged underneath, and secured to the boss of the segment-arm 33, instantly forces the rack upward out of gear with the pinion and holds it there, thus stopping any further increase of traverse of the faller, or increase of length of the layers, until the upper end of the bobbin has been entirely filled, removed, and doffed, when it is again thrown into gear, as before.

Here it may be well more particularly to describe the action of the mechanism which has controlled the movements of the rack-bar 42.

As before stated, the ratchet-wheel 35, the sleeve of which carries the pinion 34, is mounted loosely on the shaft 26 of the faller 28, while the plate 36, that carries the double-toothed dog 37 and guard-plate 38, is firmly secured or keyed to the same shaft. Hence, as the faller is raised, (and which action carries with it the plate 36 and dog 37,) the pressure of the teeth of the latter on the face of the ratchet-wheel 35 will naturally cause it to turn in the same direction also. Under such circumstances the forward and backward motion of the ratchet-wheel would, in effect, be equal—a condition of things not desired. To regulate the extent of this backward motion, therefore, a stationary spring-dog, 39, is arranged and secured to the upper side of the carriage, the tooth of which is intended to engage with the teeth of the ratchet-wheel, and thereby prevent further backward motion, which it does the moment the guard-plate 38 has been slid past its point, so that the extent of actual advance toward making a single revolution by the ratchet-wheel, as it is pressed forward by the double dog 37 on each descent of the faller, is regulated by the proper adjustment of the guard-plate 38 with relation to the position of the tooth of the stationary dog 39. This adjustment of the plate may be so made as to throw the ratchet-wheel forward one, two, three, or more teeth at a time for each descent of the faller; or for these with the increment of a half-tooth to either, or even of a half-tooth by itself, by the peculiar arrangement of the teeth of the so-called double dog 37, which for this purpose are so arranged as that while one is engaged with a tooth of the ratchet-wheel 35 the other will be midway between it and the next, thus enabling it to throw a half as well as a whole tooth, or any increased number, whether the increment be a whole, or a half, or the two combined, or more than one tooth with a half. In the same way for very fine yarn a third tooth may be arranged on the dog so as to throw a distance equal to a third of the distance between the teeth, or for any other proportionate part.

Referring back again to that stage when the lower end of the bobbin had been filled out flush with the periphery of its end, and the motion of the faller had attained a uniform rise and fall, so as to build up the upper part of the bobbin, it will be apparent that each layer of the yarn will now increase the height of the yarn from the bottom of the bobbin. Hence the depression of the faller should decrease each layer the thickness of a layer, while its range up and down should remain the same. This effect is produced by the action of the inclined face of the plate 54, which, as the layers rise, the one on the other, (and each stretch of the carriage backward is intended to wind on two layers, the one down and the other up,) by the action of the builder-screw 56 is withdrawn a certain distance for each layer from below the guide-plate 52 of the friction-roll plate 48, thus gradually lowering the latch Z, that carries the depressing-lever 43 of the faller, in this way shortening the throw of the faller downward without limiting in any degree the extent of its vibration as a whole. This action continues at regular intervals until the bobbin has been filled to the top.

The operating of the builder-screw for these purposes is effected by means of a ratchet-wheel, 67, secured or keyed fast to its end, which, in turn, is operated by a dog, 68, secured to a loose plate, 69, mounted on the same end of the builder-screw. To the side of this plate 69 is secured a pin, 70, on which is hung the end of a notched connecting-rod, 71, the notch of which is intended to engage with a crank-pin, 72, arranged eccentrically on the side of the gear-wheel 59, so that as the gear-wheel is revolved it will, for every revolution backward it may perform, raise the rod 71, and thereby force the plate 69, carrying the dog 68, backward over the teeth of the ratchet-wheel 67, the latter being held stationary for that purpose for a given distance by the stationary dog 72'. In this position, when the gear-wheel is made to perform a revolution forward, (and it makes one for every outward stretch of the jack,) it will, through the action of the pin in the notch of the rod 71, draw the plate 69 and dog 68 forward, causing the ratchet-wheel 67 to give a partial revolution to the builder-screw, and thereby withdraw the inclined plate 54 from beneath the guide-plate 52 a distance equal to the extent of the revolution and pitch of the screw. For this purpose the tooth of the dog 68 was made, during this forward throw of the plate 69, to engage with one of the teeth of the ratchet-wheel, in this respect the dog being self-acting.

Now, as the extent of this withdrawal should be regulated by the fineness or coarseness of the yarn being wound, (a coarse yarn making a thicker layer than a fine one, and vice versa,) it will be apparent that a device ought to be used to regulate the extent of this withdrawal that is capable of such adjustment as may be required for each kind of yarn. This we effect by means of a circular guard-plate, 73, attached to the bearing-standard of the screw 56, which we so arrange as partially to cover the ratchet-wheel from the action of the traveling dog 58.

The attachment is so made as that the guard may be so adjusted as to expose but one, or two or more, of the teeth of the wheel 67 to the action of the dog at a time, and thus cause the ratchet-wheel to move the builder-screw around a distance equal to the distance which would arise from the number of teeth the ratchet had been turned. By these means the faller is adapted to the winding either of coarse or fine yarn.

It is proper, however, here to remark that after the removal of every set of full bobbins, the necessary adjustments for the commencement of the filling of the new set of empty bobbins are all done by hand.

In order to complete the operation of winding the yarn upon the bobbins or cops, it becomes necessary to refer to other movements, which have been going on simultaneously with those already described. These consist in the devices used for communicating motion to the spindles for the winding of the yarn on the cops, for it must be remembered that the motion of the race-belt, so far as the direct action of the driving-pulleys is concerned, has now ceased, and consequently motion from a new source must be imparted to it, and this of such a character as to turn the spindles at a comparatively fast rate of speed when the bobbins are first put on to fill, but with a gradually-slowing motion until the lower part of the bobbin has been filled out flush with its head or end, after which, until the bobbin has been entirely filled up to the top, a uniformly slow and fast motion is communicated—that is to say, slow when the faller is winding the layer of yarn near the outer edge of the bobbin, and uniformly faster and faster as the layer being wound nears its center, and vice versa; but as the devices for this purpose in our machine are similar to those in common use, and commonly called the "quadrant" or "compensating" movement, we do not deem it necessary to describe them farther, with this exception—and which we claim as new—that, when the lower part of the bobbin has been filled out, instead of disengaging by hand the screw-head $o$, which raises the chain-carrier $p$, as is the present method, we attach devices by which this is effected automatically.

These devices consist of a slide-rod, $q$, arranged in suitable guides at the side of the quadrant-frame, on the lower end of which is attached a slide-plate, $r$, having an inclined or wedge-shaped face, the inclined edge of which is brought in contact with a pin, $s$, secured to the side of a slide bolt or tooth, $t$, in such a manner that when the slide-rod $q$ is raised it draws up the wedge-shaped plate $r$, attached to its lower end, which, acting on the pin $s$, forces out the slide-bolt $t$, detaching thereby the pawl $t^1$ on the driving-pulley $s'$ from the ratchet-wheel $u$, which, being fast to the gear $u'$, that operates the pinion $v$ on the lower end of the quadrant-screw $w$, thereby disengages the one from the other, and prevents the further rise of the screw head or nut $o$ that carries the chain $x$, which drives the drum $y$ that imparts motion to the spindles for the winding of the yarn on the cops, this disengagement of the gear-wheel $u'$ from the pinion through the means just described being effected by means of an adjustable carrier or lift, $t^2$, arranged on the slide-rod $q$, on which it is adjusted and made fast at such height by a screw that at the right moment the screw-head $o$ shall raise it so as to disengage the gears when the lower end of the bobbin shall have been filled. This height, of course, will be regulated by the diameter of the bobbin-head to be filled and the fineness or coarseness of the yarn to be wound.

The chain $x$, to which reference has previously been made as imparting this regulated motion to the drum for the winding of the yarn on the cops, is attached at one end to the link $p$ on the screw-head $o$ of the compensation movement, and at the other to the chain-spool $y$, around which it is wound. On the inner end of this spool is cut a series of notches or teeth, for the purpose of gearing with a pin, 74, arranged eccentrically on the side of the gear-wheel 75, both being mounted on the same shaft $e$.

The spool $y$, as it is turned by the drag of the chain through the pin 74, imparts motion to the gear 75, and the latter, through the intermediate pinion 76, to the pinion 77 on the shaft 78 of the carrying-pulley S', on which it is loosely mounted. Through the pinion 77 this motion is communicated to the shaft 78 and pulley S' by means of a ratchet-wheel, 79, keyed to the shaft 78, and self-acting dog 80, and through the pulley S' to the race-belt which drives the drum $d$ and spindles. This arrangement of the gears 75, 76, and 77, as combined with the dog 80, ratchet-wheel 79, and shaft 78, possesses this advantage over others, that during the forward movement of the carriage they are not compelled to move with the same velocity as the carrying-pulley S', which they have to do in several other machines—a fact of considerable importance, so far as economy of tear and wear is concerned.

Such are the means used for winding the yarn on the cops, the necessary motion for which is derived from the upper or drawing-in scroll, V, which, for this purpose, continues to revolve until the carriage, by its return, shall have unshipped it and reset the main shipper preparatory to the spinning of a new stretch. Just previous to this act, however—that is to say, at the end of each backward movement of the carriage—the machine is temporarily stopped to piece the ends, should any be broken. This stoppage we effect by means of an auxiliary shipping-bar, 81, to which the belt-shipper 82 is in reality secured, and not to the main shipping-bar X.

The auxiliary shipper 81 is arranged immediately under the main shipper X, along the under side of which it is made to slide by means of a cord or other equivalent device attached to its rear end, the other end of the cord being made to pass over a pulley, 83, mounted in bearings on an arm, 85, secured to the driving-gear frame B, and thence under another pulley, 84, mounted on a standard, 86, on the floor, where it is secured to the end of a connecting cord or rod, 87, whose other end is suitably connected with the lower end of a hand-lever, 88, pivoted to the side of the frame 90 of the quadrant or compensating gear, a catch, 89, being provided to hold the lever back when the belt has been thrown off.

The ends having been pieced, and it being desired to set the machine again in motion, the lever 88 is detached from the clutch, when a coiled spring, 91, having one of its ends attached to the main shipper X, and the other to the auxiliary shipper 81, as seen in the drawings, Fig. 15, instantly retracts the latter, thereby throwing the main belt on the pulleys D and F, and putting the machine in motion for the twisting of a fresh stretch of yarn.

Instead of the cord and pulleys, a system of connecting-rods and bell-crank levers, suitably arranged for the purpose, may be substituted, by which a positive motion, as well to ship as to unship the belt, may be communicated to the auxiliary shipper 81.

Having thus described our improvements in self-acting spinning-jacks, what we claim as new, and desire to secure by Letters Patent, is—

1. The combination of the pulley D, main shaft A, gear E, pinions O and P, shaft $b$, and clutch-gear Q with the pinion J and lower or drawing-out scroll, I, arranged and operated as and for the purposes set forth.

2. The combination of the angle-lever 3, sliding sleeve-rod 1, stud 8, spring 7, lever 5, rock-shaft 6, and fork 9 with the sliding clutch-gear Q, whereby the latter is thrown into gear with the pinion P, for the purposes set forth.

3. The arrangement of the pendent arm 13 on the rear of the carriage R, in combination with the devices specified in the second claim, whereby the clutch-gear Q is automatically thrown into gear with the pinion P, for the purposes specified.

4. In combination with the devices specified in the second claim, the arrangement of the plate 11, pawl 10, and rack-bar 12, for the purpose of holding the clutch-pinion Q in gear with the pinion P during the forward movement of the carriage R, as described.

5. In combination with the pawl 10 and rack-bar 12, operating as described, the arrangement of the stud 14 on the sleeve-rod 1, when used in connection with an arm, 13, arranged on the rear and under side of the carriage R, whereby as the latter nears the end of its outward stretch the pawl 10 is automatically detached from the rack-bar 13 and the sleeve-rod 1 forced back, thereby disengaging the clutch Q from the pinion P and stopping the further advance of the carriage R, as set forth, for the purposes described.

6. The combination of the driving-pulley F, gear-wheel G, intermediate pinion K, transmitting-pinion L, gear-wheel M, shaft N, and saw-toothed pinion $i$ with the pinion $i'$ and upper or drawing-in scroll, V, the whole being arranged and operated in the manner and for the purposes set forth.

7. The combination of the sleeve-pulley F, gear-wheel G, intermediate pinion K, gear-wheels L and M, shaft N, and pinion T with the friction-gear wheel V and race-belt pulley S, arranged as and for the purposes described.

8. The combination of the sleeve-pulley F, gear G, intermediate pinion K, and gears L and M, shaft N, and endless-screw pinion $f$ with the concave segmental pinion $g$ of the swinging rock-shaft $h$, arranged and operated as and for the purpose described.

9. In combination with the lever 3, sleeve-rod 1, stud 8, spring 7, arm 5, rock-shaft 6, and fork 9, the arrangement of the upper arm, $m$, and stop-pin $l$ on the main shipping-bar X, whereby the immediate effect of the spring 7, as compressed to throw the clutch Q into gear with the clutch-pinion P, is momentarily stopped until the main shipping-bar has been properly set, as set forth, and whereby the possibility of the two scrolls I and V being in gear even for a moment at the same time is prevented.

10. In connection with the devices named in the last claim as used for keeping the clutch Q out of gear, the arrangement of the arm 92 on the rock-shaft 6, whereby while both scrolls I and V are out of gear the segmental pinion $g$ on the rock-shaft $h$ is thrown into gear with the worm-pinion $f$, by means of which, through the system of levers Z, Z', Z'', and Z''' and the arm $n'$ on the carriage R, the latter is drawn steadily backward for a regulated distance to compensate for the shortening of the yarn as the final twist is being thrown in, substantially as described.

11. In combination with the drum S that drives the spindles, the arrangement of the ratchet-wheel 27 on the shaft 78 of the carrying-pulley S' and self-acting dog 29 on the side of the latter, when used in connection with the belt 24 of the faller-frame 28, arranged and operated as described, whereby as the race-belt is reversed for performing the backing-off operation the faller-frame 28 is depressed, for the purposes set forth.

12. The pulley 77, shaft 78, carrying-pulley S', ratchet-wheel 79, and self-acting dog 80, in combination with the notched chain-spool $y$, pulley 75, and pin 74, arranged and operated as and for the purpose set forth.

13. The arrangement and combination of the angle-lever 15, main shipping-rod 2, spring 16, lever 18, rock-shaft 19, and fork 20 with the friction-gear U and pulley S, for the purpose described.

14. In combination with the devices used and set forth in the thirteenth claim, the arrangement of the arm 22 on the upper end of the rock-shaft 19, and the pin 23 on the upper side of main shipping-bar X, for the purpose set forth.

15. In combination with the devices used in the thirteenth and fourteenth claims, the arrangement of the spring 30 and stud-pin 31, for the purpose set forth.

16. The combination of the rack 42 with the pinion 34, ratchet-wheel 35, double-toothed dog 37, carrying-disk 36, guard-plate 38, and detent 39, the whole being arranged and operated substantially as and for the purposes set forth.

17. In combination with the devices last claimed, the thumb-screw 64, notch 65, and spring 66, for the purpose set forth.

18. In combination with the rack-bar 42, operating as described, the slotted segmental lever 33, actuating-lever 43, and latch Z, as arranged, for the purpose set forth.

19. The combination of the ratchet-wheel 27, pawl 29, pulley S', belt 24, segment-pulley 25, segment-lever 33, connecting-rods 43 and 45, and double lever Y with the angle-lever 15, for the purpose set forth.

20. In combination with the lever Y, operated as described, the arrangement of the spring 93, connecting-rod 94, and notched arm $n'$, whereby on the depression of the faller 28 the arm $n'$ is released from the upturned end of the lever $Z'''$, that drew the carriage back during the throwing in of the finishing twist to the yarn, as described.

21. In combination with the latch Z, the slide-plate 48 and friction-roll 47, for the purpose set forth.

22. In combination with the slide-plate 48, friction-roll 47, and latch Z, the inclined guide-plate 52 and inclined slide-plate 54, arranged as and for the purposes specified.

23. In combination with the slide 54, the grooved screw-head 55 and builder-screw 56, as arranged, for the purpose set forth.

24. In combination with the builder-screw 56, the arrangement of the ratchet-wheel 67, traveling dog 68, loose plate 69, pin 70, notched pendent connecting-rod 71, pin 72', gear 59, stationary dog 72, and circular guard-plate 73, for the purposes set forth.

25. The combination of the heart-shaped cam 57, builder-plate 53, and friction-roll plate 48 with the latch Z, arranged and operated as and for the purposes set forth.

26. In combination with the screw-head $o$ of the compensation-gear used in regulating the motion of the spindles in winding the yarn on the bobbins, the adjustable lift $t^2$, slide-rod $q$, inclined plane $r$, pin $s$ and bolt $t$, dog $t^1$, and ratchet-wheel $u$, the whole being arranged and operated in the manner and for the purposes set forth.

27. The combination of the auxiliary shipping-bar 81 with the main shipping-bar X, arranged and operated as described, for the purpose set forth.

28. The combination of the arm or lever $j$, on the upper end of the rock-shaft W, with the pin $j'$, arranged on the upper side of the main shipping-bar X, for the purpose set forth.

29. The combination of the spring 30, main shipping-rod 2, arm 17, and pin 95 with the arm 32 of the rock-shaft W and yoke $k$ of the upper scroll, V, whereby the latter is thrown into gear, as set forth.

PRENTISS J. KENT.
N. W. BANCROFT.

Witnesses:
F. J. BLACKMER,
NATHAN L. BANCROFT.